2,901,445

Patented Aug. 25, 1959

2,901,445

CELLULAR POLYURETHANE REACTION PRODUCT CONTAINING POLYSILOXANE AND METHOD OF PREPARING SAME

Ralph F. Harris, Penns Grove, N.J., assignor to E. I. du Pont de Nemours and Company, Wilmington, Del., a corporation of Delaware No Drawing. Application June 17, 1955
Serial No. 516,302

4 Claims. (Cl. 260—2.5)

This invention relates to foams having improved cell structure and more particularly to a process for preparing foams having improved cell structure from a polytetramethylene ether glycol-polyisocyanate composition.

The foams which are obtained from polytetramethylene ether glycol-polyisocyanate compositions have a high resilience and high tensile strength and are superior to latex foams in resistance to aging from heat, light and oxygen. However, a problem is often encountered in regard to the cell structure of these foams in that the cells are often coarse and non-uniform and detract from the physical appearance of the foam.

This invention has as an object to provide a process for preparing foams having improved cell structure from a polytetramethylene ether glycol-polyisocyanate composition. Other objects will appear hereinafter.

The object of the present invention is accomplished by mixing with a liquid polymeric polytetramethylene ether glycol-polyisocyanate composition from about 0.05 to 2.0% by weight of a polysiloxane having a viscosity of from about 0.65 to 30,000 centistokes, and foaming the resulting mixture by reacting it with water.

In carrying out the process of the present invention, it is merely necessary to mix the polysiloxane with the polytetramethylene ether glycol-polyisocyanate composition. This mixture is then foamed in the normal manner by thoroughly mixing with water and usually a catalyst, and after pouring the mass into a mold, allowing the mixture to foam by virtue of the carbon dioxide which is evolved. The carbon dioxide evolved is trapped by the viscous reacting material and forms small bubbles. This formation of bubbles gradually expands the mass and forms a foam. At the same time that the isocyanate groups in the polytetramethylene ether glycol-polyisocyanate composition are reacting with water and evolving carbon dioxide they are also cross linking the compound and curing it so as to tie the molecules together. Usually a catalyst is resorted to in order to control the rate of curing in the foam. In the presence of a catalyst, the rate of curing and the rate of evolution of carbon dioxide is considerably accelerated. The preferred catalysts for the reaction are bases and they include such bases as N-methylmorpholine, diethyl ethanolamine, triethylamine, pyridine, etc. Aqueous solutions of bases such as potassium carbonate, sodium carbonate, etc. may also be used. The amount of catalyst ordinarily used varies from about 0.05 to 2.0% based on the polytetramethylene ether glycol-polyisocyanate composition. Ordinarily tertiary amines are preferred as catalysts.

Of the polysiloxanes which are useful in the process of the present invention, the dimethyl polysiloxanes are generally preferred. These polysiloxanes are characterized by the recurring structural units of the formula —O—Si(CH$_3$)$_2$— and are terminated by —Si—(CH$_3$)$_3$ groups. They may be prepared by the hydrolysis and polymerization of dimethyl dichlorosilanes. A general review of the preparation of these polysiloxanes is described by Rochow, "Chemical and Engineering News," 23, p. 612. Other references which describe the preparation of specific polysiloxanes include U.S.P. 2,258,218 and U.S.P. 2,258,222.

Dimethyl polysiloxanes containing from about 5 to 50% by weight of phenyl groups are also operable and are preferred in the process of the present invention. It has been observed that as the amount of phenyl groups increase in the dimethyl polysiloxane, the foam obtained has a greater proportion of separate, non-interconnecting cells and in many applications, this type of cell structure is desirable.

The polysiloxanes of the present invention have a wide range of viscosity varying from about 0.65 centistoke at 25° C. to 30,000 centistokes at 25° C. A centistoke is 0.01 stoke and is the kinematic viscosity unit corresponding to the centipoise. In the present process, the polysiloxanes which have a viscosity at 25° C. of from 10 to 1,000 centistokes are generally preferred for use in improving the cell structure of the polyisocyanate foams. Polysiloxanes having a viscosity lower than about 10 centistokes are usually hazardous to use due to their low flash point, while polysiloxanes having a viscosity much above 1,000 centistokes are generally too viscous for easy handling and mixing. However, it is to be understood that polysiloxanes having a viscosity of 30,000 centistokes are operable if thorough mixing with the polyisocyanate composition is accomplished.

The amount of polysiloxane which is added to the polytetramethylene ether glycol-polyisocyanate composition should range from about 0.05 to 2.0% by weight. When working with less than about 0.05% by weight, difficulty is often experienced in assuring thorough distribution of polysiloxane throughout the viscous polyisocyanate composition. On the other hand, amounts in excess of about 2.0% by weight tend to exhibit no significant increase in effect. It is to be understood that the optimum concentration of polysiloxane for each particular polyisocyanate composition will vary somewhat for each specific case. The polysiloxanes are believed to act as surface active agents and thus enter into the liquid-air interface and reduce the surface tension in the viscous polytetramethylene ether glycol-polyisocyanate compositions.

The polytetramethylene glycol-polyisocyanate compositions which are useful in the process of the present invention should be liquid or should melt below 100° C. since the foaming step will ordinarily be conducted at temperatures below about 100° C. This limitation is set out for these compositions since water is ordinarily used to provide the carbon dioxide which is the foaming agent and at temperatures much above 100° C. the water would be converted to steam which would be much more difficult to handle safely and accurately. Furthermore, at temperatures much above 100° C., the reaction of isocyanates with active hydrogen compounds is quite rapid and the reaction would take place so fast that the proper formation of foam would be quite difficult. Preferably, the composition should melt at temperatures not higher than about 50° C. since this will permit a reasonable range of application of the composition with water and pouring into a mold without undue hazard.

In general, the polytetramethylene ether glycolpolyisocyanate compositions may be prepared by the reaction of a polytetramethylene ether glycol, with or without additional active hydrogen-containing compounds, and a diisocyanate and/or triisocyanate in the proper proportions so as to yield an isocyanate-terminated composition. These compositions may conveniently be termed prepolymers. Thus a prepolymer may be prepared by reacting an organic diisocyanate with a polytetramethylene ether glycol. In general, it is only necessary to mix the proper proportions of reactants with a slight amount of heating. Normal temperatures from about room temperature up to about 100° C. are satisfactory; however, at higher temperatures shorter reaction times are required. Other prepolymers which contain a ratio of the number of free isocyanate groups to the number of molecules greater than 2 may also be used in the process of the present invention. These compositions are more particularly described and claimed in co-pending application of Barthel, Serial No. 505,039, filed April 29, 1955. Various methods are available for the preparation of these latter compositions, which include: (1) the reaction of a mixture of di- and triisocyanates with the polytetramethylene ether glycol; (2) the reaction of a polytetramethylene ether glycol molecule with 2 moles of a diisocyanate to form a diurethane which may then be reacted with another molecule of a diisocyanate to form what is believed to be an allophanate having 3 terminal isocyanate groups; (3) the formation of a diester by the reaction of a polytetramethylene ether glycol with a dibasic acid containing a hydroxyl group on its nucleus, followed by the reaction of the diester with 3 molecules of a diisocyanate; (4) the formation of phosphate esters of polytetramethylene ether glycol, followed by the reaction with diisocyanates; (5) the formation of a urethane from a polytetramethylene ether glycol with 2 moles of a diisocyanate, followed by the reaction with a trihydroxy compound such as glycerine; (6) the reaction of 3 moles of a diisocyanate with a compound produced by reacting 1 mole of a diisocyanate with 1 mole of polytetramethylene ether glycol and a trihydroxy compound; and (7) the reaction of a triol type compound with 3 moles of a diisocyanate, the resulting product then being mixed with the reaction product of 1 mole of a polytetramethylene ether glycol and 2 moles of a diisocyanate to yield a mixture of di-functional and tri-functional isocyanates.

The polytetramethylene ether glycols which are useful in the formation of the polytetramethylene ether glycol-polyisocyanate compositions of the present invention should have a molecular weight of between about 750 and 7500. If the molecular weights are appreciably lower than about 750 the elasticity and resilience of the foam appears to decrease rapidly and the rubbery nature of the foam is no longer present, while, on the other hand, if the molecular weight rises much above 7500, a more plastic type of material is formed and it appears to have a deader feel and not to be a lively, resilient foam. At least 60% of the total weight of the polytetramethylene ether glycolpolyisocyanate compositions used in the present invention should be the residue obtained by removing the terminal hydrogen atoms from a polytetramethylene ether glycol, since the resilient nature of the foam is due, to a great extent, to the polytetramethylene ether glycol molecule and it is, therefore, necessary that an appreciable portion of the foam be composed of that material.

The amount of water used for preparing the foams from the polytetramethylene ether glycol-polyisocyanate compositions can be varied from about 50% to several hundred percent of the theoretical, said theoretical amount being 1 molecule of water per 2 isocyanate groups. Ordinarily, the amount of water used will be in excess of 100% of theory but not too great an excess. An excess of 10 to 50% is a satisfactory range; however, 200 to 300% frequently will give a foam of good properties.

In preparing the polytetramethylene ether glycolpolyisocyanate compositions, any of a wide variety of organic diisocyanates or triisocyanates may be used, including aromatic, aliphatic and cycloaliphatic compounds and combinations of these types. Representative compounds include 2,4-toluene diisocyanate, m-phenylene diisocyanate, methylene bis-(4-phenylisocyanate), 4-methoxy m-phenylene diisocyanate, 1,6-hexamethylene diisocyanate, 2,4,6-toluene triisocyanate and 2,4,4'-diphenylether triisocyanate.

The density of the resulting foams may be varied by the amount of isocyanate that is used. If the amount of isocyanate present is not sufficient to give enough carbon dioxide to give as low a density foam as is desired, additional diisocyanate may be added before the addition of the water for foaming.

The following examples will better illustrate the nature of the present invention; however, the invention is not intened to be limited to these examples. Parts are by weight unless otherwise indicated. In the tables of the examples, numbers 1 to 4 have been used ot describe the cell structure of the foams. These numbers have the following values:

1=excellent cells, fine and uniform.
2=good uniform cells, well distributed.
3=fair cell structure, much better than control.
4=poor, very coarse cells, control.

EXAMPLE 1

100 parts of a polytetramethylene ether glycol having a molecular weight of 3000 is melted at 45 to 60° C. taking care to keep the material free from water contamination. A mixture of 11 parts of 2,4-toluene diisocyanate and 1.95 parts of 2,4,6-toluene triisocyanate, the mixture of di- and triisocyanate being at 80° C., is then added to the melted glycol. Without additional heating and with continued agitation, the mixture is allowed to react under anhydrous conditions at 35° C. for about 20 hours, after which time it is ready for use.

90 parts of the above prepared prepolymer is mixed at room temperature with 10 parts of 2,4-toluene diisocyanate and the desired amount of dimethyl polysiloxane mixed in. A mixture of 2 parts of water and 1 part of N-methylmorpholine catalyst is then added and the entire mixture thoroughly mixed for about 1 to 2 minutes, after which time it is poured into a mold and allowed to foam.

The foam obtained in this manner is snappy and resilient in nature and has a density of about 3 to 5 lbs. per cu. ft.

The prepolymer can also be foamed with water and catalyst but without added diisocyanate to yield a cellular product of higher density.

The table which follows illustrates the effects of the added polymethylsiloxane on cell structure.

Table I

| Viscosity of Polysiloxane | Weight, percent | Cell Structure of Foam |
|---|---|---|
| Control | 0 | 4 |
| Dimethyl Polysiloxane: | | |
| 10 centistokes | 0.05 | 1 |
|  | 0.1 | 1 |
|  | 1.0 | 2 |
| 50 centistokes | 0.1 | 1 |
|  | 1.0 | 2 |
|  | .05 | 3 |
| 500 centistokes | 0.1 | 2 |
|  | 1.0 | 2 |
|  | 2.0 | 2 |
| 1,000 centistokes | 0.1 | 3 |
|  | 1.0 | 3 |
| Dimethyl Polysiloxane Containing 5% By Weight of Phenyl Groups: | | |
| 50 centistokes | 0.1 | 1 |
|  | 1.0 | 2 |
| 500 centistokes | 1.0 | 3 |
| Dimethyl Polysiloxane Containing 25% By Weight of Phenyl Groups: | | |
| 100 to 150 centistokes | 0.05 | 1 |
|  | 0.1 | 2 |
|  | 1.0 | 2 |
|  | 2.0 | 1 |

EXAMPLE 2

A kettle is charged with 6.63 parts of 2,4-toluene diisocyanate and warmed to 31° C. An addition of 52.1 parts of molten polytetramethylene ether glycol having a molecular weight of 3065 is made to the diisocyanate over a 50 minute period. The resulting reaction mass is heated to 90° C. and held at that temperature for 1 hour. An additional 10.37 parts of 2,4-toluene diisocyanate is added to the kettle and the reaction mass heated and held at 140° C. for 2 hours. After cooling, the polymer is ready for use.

This polymer is foamed as described above by mixing 100 parts thereof with the desired amount of dimethyl polysiloxane and then incorporating 2.36 parts of water and 1 part of N-methylmorpholine as catalyst just prior to foaming. The elastomeric foams obtained in this manner have excellent physical properties and have a density of about 3.5 lbs./cu. ft.

Table II illustrates the effect of the polysiloxane on cell structure.

Table II

| Polysiloxane | Weight, percent | Cell Structure of Foam |
|---|---|---|
| Control | 0 | 4 |
| Dimethyl Polysiloxane: | | |
| 10 centistokes | 0.1 | 1 |
|  | 1.0 | 2 |
|  | 2.0 | 3 |
| 50 centistokes | 0.1 | 1 |
|  | 1.0 | 2 |
|  | 2.0 | 3 |
| 500 centistokes | 1.0 | 3 |
|  | 2.0 | 3 |
| 1,000 centistokes | 1.0 | 1 |
|  | 2.0 | 1 |
| Dimethyl Polysiloxane Containing 5% By Weight Of Phenyl Groups: | | |
| 50 centistokes | 0.1 | 1 |
|  | 1.0 | 2 |
|  | 2.0 | 3 |

EXAMPLE 3

A polyether polyester is prepared by heating a mixture of 1870 parts of a polytetramethylene ether glycol having a molecular weight of 935, 97 parts of 95% by weight glycerine and 292 parts of adipic acid at 170° C. for 20 hours under a nitrogen atmosphere and with agitation. After an additional heating period of 4 hours at 170° C. and 1 to 10 mm. mercury pressure, the mass is cooled and analysis shows a hydroxyl number of 59.5, an acid number of 7.0, and 0.18% by weight of water.

A polyisocyanate polymer is prepared by heating 420 parts of the above prepared polyester with 80 parts of 2,4-toluene diisocyanate at 100° C. for 30 minutes. The mass is cooled to room temperature and is then ready for foaming.

Foaming is carried out by mixing 0.25 part of a dimethyl polysiloxane having a viscosity of 500 centistokes with 50 parts of the above polymer and, after incorporating 1.5 parts of water containing about 0.5 of diethylcyclohexylamine catalyst, the mass is poured into molds.

The foam thus obtained was flexible and resilient and had very good cell structure as compared to the poor cell structure obtained when the polysiloxane was omitted.

As many widely different embodiments of this invention may be made without departing from the spirit and scope thereof, it is to be understood that this invention is not limited to the specific embodiments thereof except as defined in the appended claims.

What is claimed is:

1. A process for the preparation of cellular reaction products which comprises mixing a liquid polymeric polytetramethylene ether glycol-organic polyisocyanate reaction product having terminal isocyanate groups and wherein at least 60% by weight of the composition is the residue obtained by removing the terminal hydrogen atoms from a polytetramethylene ether glycol having a molecular weight of from about 750 to 7,500, with from 0.05 to 2.0% by weight of a polysiloxane which is characterized by the recurring structural units of the formula

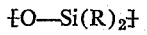

wherein R is a radical selected from the group consisting of methyl and phenyl radicals, with the proviso that the phenyl radicals comprise not more than about 50% by weight of the polysiloxane, said polysiloxane having a viscosity of from 0.65 to 30,000 centistokes and thereafter reacting the mixture with water so as to form a cellular reaction product.

2. The process of claim 1 wherein the polysiloxane is a dimethyl polysiloxane.

3. The cellular reaction products produced by the process of claim 1.

4. In the process of preparing cellular reaction products by reacting a liquid polymeric polytetramethylene ether glycol-organic polyisocyanate reaction product having terminal isocyanate groups and wherein at least 60% by weight of the composition is the residue obtained by removing the terminal hydrogen atoms from a polytetramethylene ether glycol having a molecular weight of from 750 to 7500 with water, the step which comprises mixing the polytetramethylene ether glycol-organic polyisocyanate reaction product, prior to the reaction with water, with from 0.05 to 2.0% by weight of a dimethyl polysiloxane having a viscosity of from 0.65 to 30,000 centistokes.

References Cited in the file of this patent
UNITED STATES PATENTS

| 2,589,317 | Young et al. | Mar. 18, 1952 |
| 2,726,219 | Hill | Dec. 6, 1955 |
| 2,764,565 | Hoppe et al. | Sept. 25, 1956 |

OTHER REFERENCES

Rochow: "Chemistry of the Silicones," 2nd edition (1951), published by Wiley & Sons, Inc., New York, pages 134–135.

The Condensed Chem. Dict., 5th edition, 1956, published by Reinhold Pub. Corp., New York, page 1055.